TWO-WAY SPEECH AMPLIFIER

Filed June 18, 1963 4 Sheets-Sheet 1

Karl Ivar Lennart Skoog
INVENTOR.

BY Wenderoth, Lind and Ponack, attorneys

INVENTOR.
Karl Ivar Lennart Skoog
BY Wenderoth, Lind and Ponack, attorneys

TWO-WAY SPEECH AMPLIFIER

Filed June 18, 1963 4 Sheets-Sheet 3

Karl Ivar Lennart Skoog
INVENTOR.

BY Wenderoth, Lind and Ponack, attorneys

Karl Ivar Lennart Skoog
INVENTOR.

BY Wenderoth, Lind and Ponack, attorneys

United States Patent Office 3,392,243
Patented July 9, 1968

3,392,243

TWO-WAY SPEECH AMPLIFIER

Karl Ivar Lennart Skoog, Farsta, Sweden, assignor to Aktiebolaget Gylling & Co., Stockholm-Grondal, Sweden Filed June 18, 1963, Ser. No. 288,642
Claims priority, application Sweden, July 24, 1962, 8,169/62
6 Claims. (Cl. 179—170.8)

Figures 1, 2:
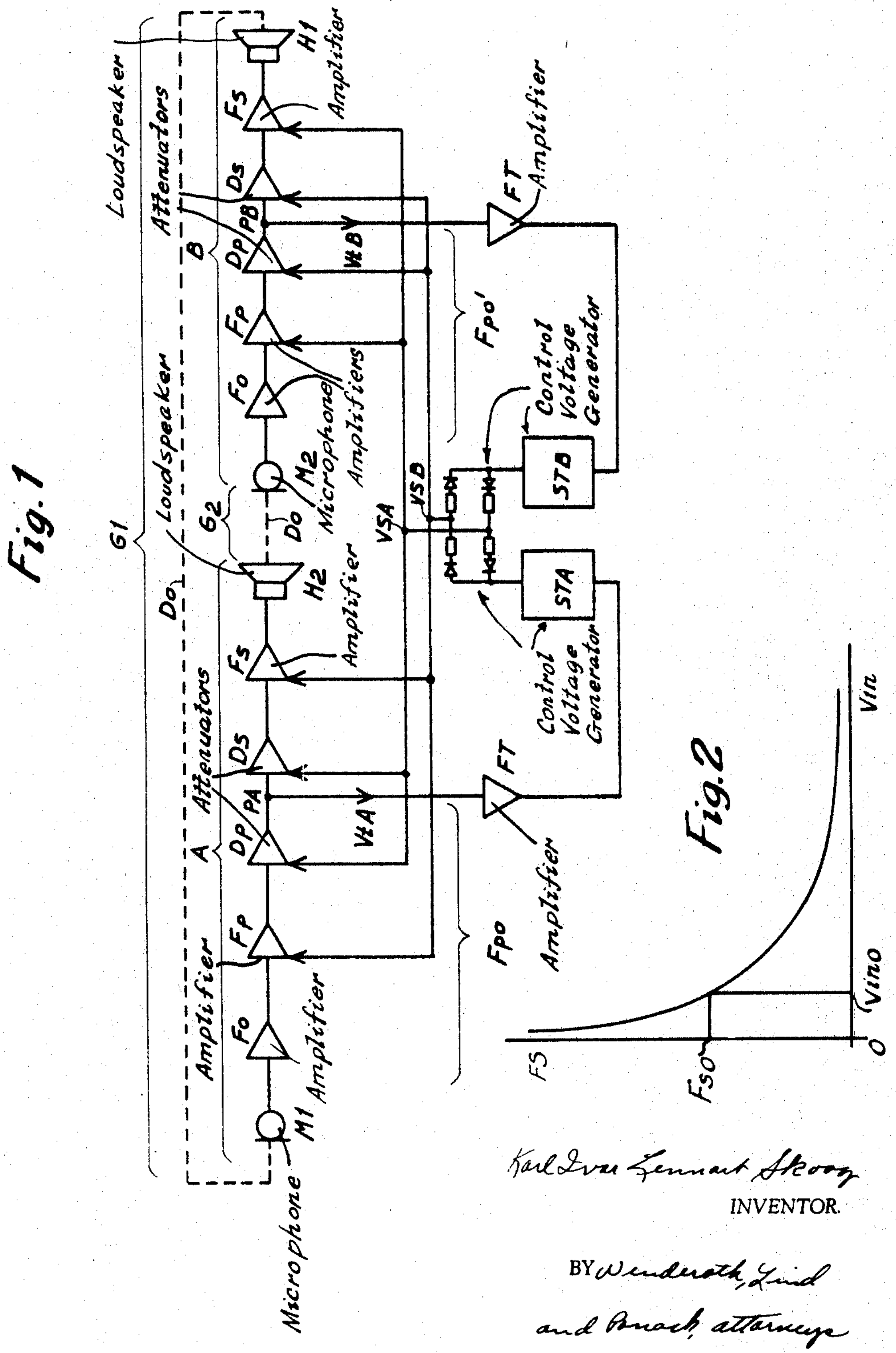

The present invention relates to an amplifier for two-way communication through two oppositely directed channels, said amplifier being provided with automatic control means which in dependence of signal voltages (speech voltages) supplied to the input terminals of one of the channels increases the amplification in said channel from a moderate value (the rest value) to a maximal value (the active value) and at the same time decreases the amplification in the other channel from a value which corresponds to said rest value to a minimum value in which the amplification channel can be totally blocked.

Said control means comprises a device for generating control voltages in each channel and a number of controllable amplifier stages in each channel to which control voltages generated in said device are supplied.

Amplifiers of the kind indicated and of different types are already known. They are mainly used for loud-speaking telephone systems, for example of the pushbutton operated quick telephone type.

Telephone systems of that type comprise a number of telephone stations between which speech connections can be established. Each station has a loudspeaker and a microphone. When two stations are connected to each other the microphone of one of the stations is connected to the input of one of the channels of the common amplifier. To the output of the same channel is the loudspeaker of the other station connected. The microphone of the last mentioned station is connected to the input of the other amplifier channel. To the output of the last-mentioned amplifier channel is the loudspeaker of the first-mentioned station connected. In telephone systems of that kind there is a risk for acoustical reaction to occur due to the fact that sound is transmitted from the loudspeaker to the microphone at each station. This risk is very great if the microphone and the loudspeaker in each station are located near each other, for example mounted in the same casing. This risk for self oscillation makes it impossible to choose the rest amplification of the channels so great as it would be desirable for obtaining and audible reproduction of the first syllable of each word or sentence which is spoken. For improving the device in that respect, attempts have been made to make the control process quicker, so that the amplification of the active channel will increase very rapidly already when the first syllable is spoken, so that only a small part of said syllable will be lost. Such a quick control process has, however, a disadvantage, in that the amplification in the active channel will vary during the conversation. Therefore, the continuity of the transmission will be bad.

In amplifiers of the kind indicated there is, therefore, a number of factors which have to be weighed against each other for obtaining a compromise which will be the most advantageous. By mass production of amplifiers it is also a great difficulty to obtain an even product. A certain tolerance must also be allowed for the component used, especially for transistors and the like, and an alteration of the characteristics of the amplifier caused by the deviation of the value of one component from the wanted value, even if such deviation per se is permitted, can be increased by corresponding deviations of the values of one or more of the other components. Further, some of the components, such as valves, transistors and diodes have characteristics which are not stable but may be subject to alterations under the influence of time, temperature and air moisture or other climatic conditions.

The present invention has for an object to provide an amplifier of the kind indicated which in comparison to amplifiers hitherto known has great advantages with respect to the most suitable compromise between its different characteristics, such as the rest amplification, the rapidity of the control process, retaining abilities (the continuity in the reproduction of a speech), and further with respect to the similarity and evenness of the product when the amplifier is produced in large series, and also with respect to the stability and evenness of the amplifier during use under different ambient conditions such as the temperature, the climatic conditions, variations in the voltage of the current supply source, and so on.

The invention is substantially characterized by the fact that each amplifier channel is provided with an output point for deriving a signal voltage, which is supplied to the device for generating the control voltage, and at least two amplifier stages which are controlled by said control voltages, said stages being adapted, when they are supplied with such control voltages, to effect an increase of the amplification, one of said stages being located before and one after the said output point from which the signal voltages for generating the control voltages are derived, each channel being also provided with one or more amplifier stages which is adapted to effect a decrease of the amplification when control voltages is supplied thereto, at least one of said amplifier stages being located after said output point.

Figure 3:
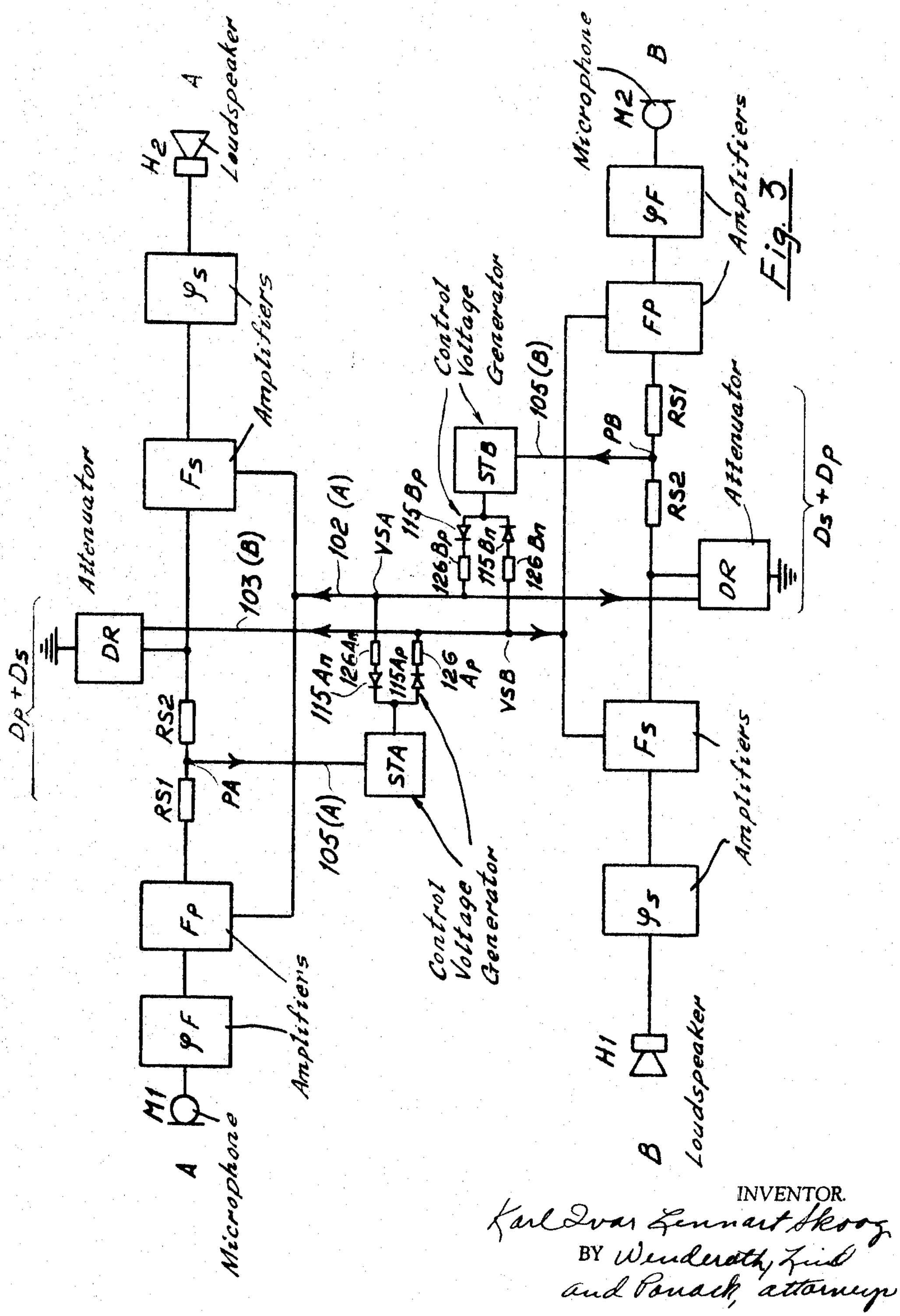
Figure 4:
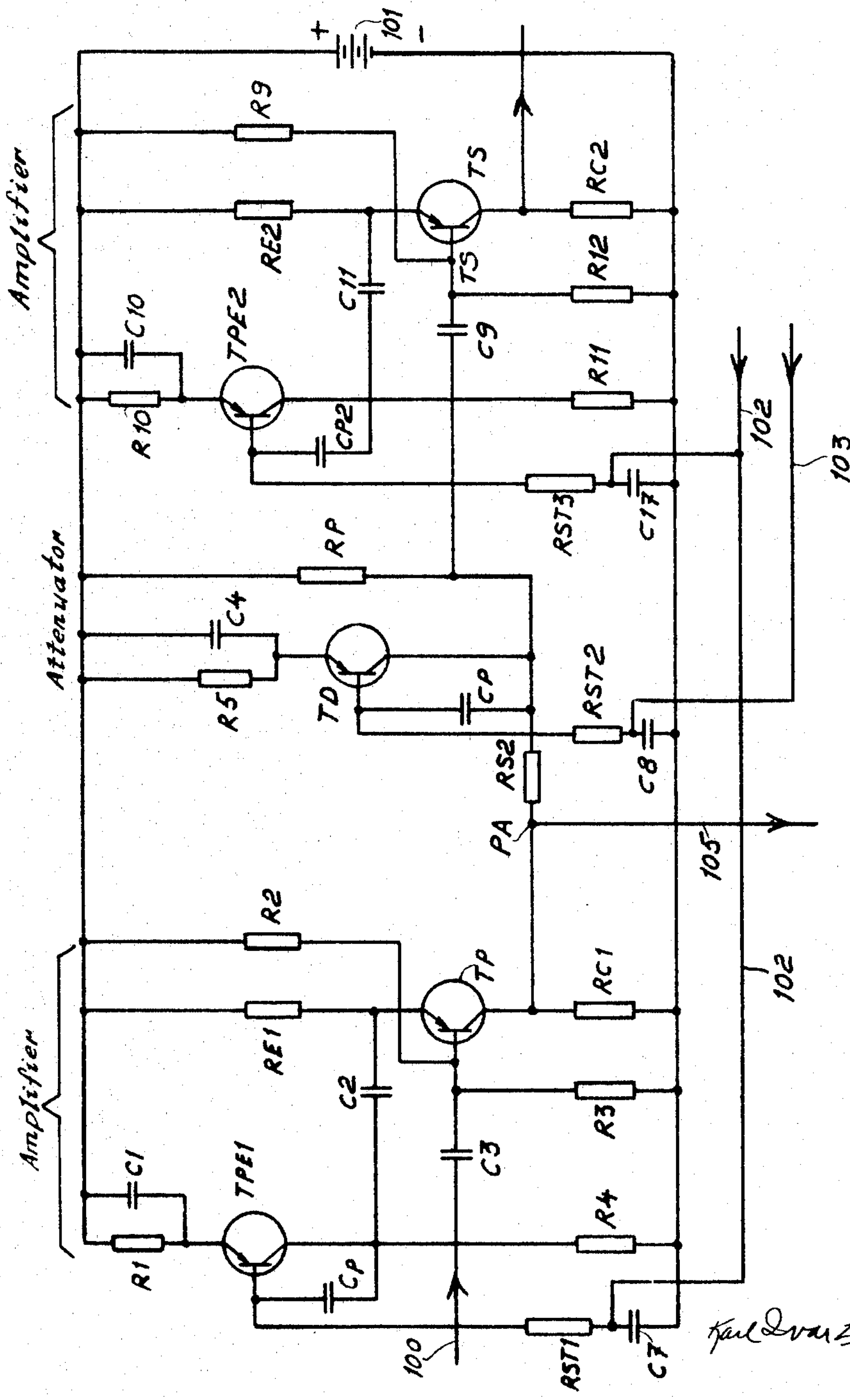
Figure 5:
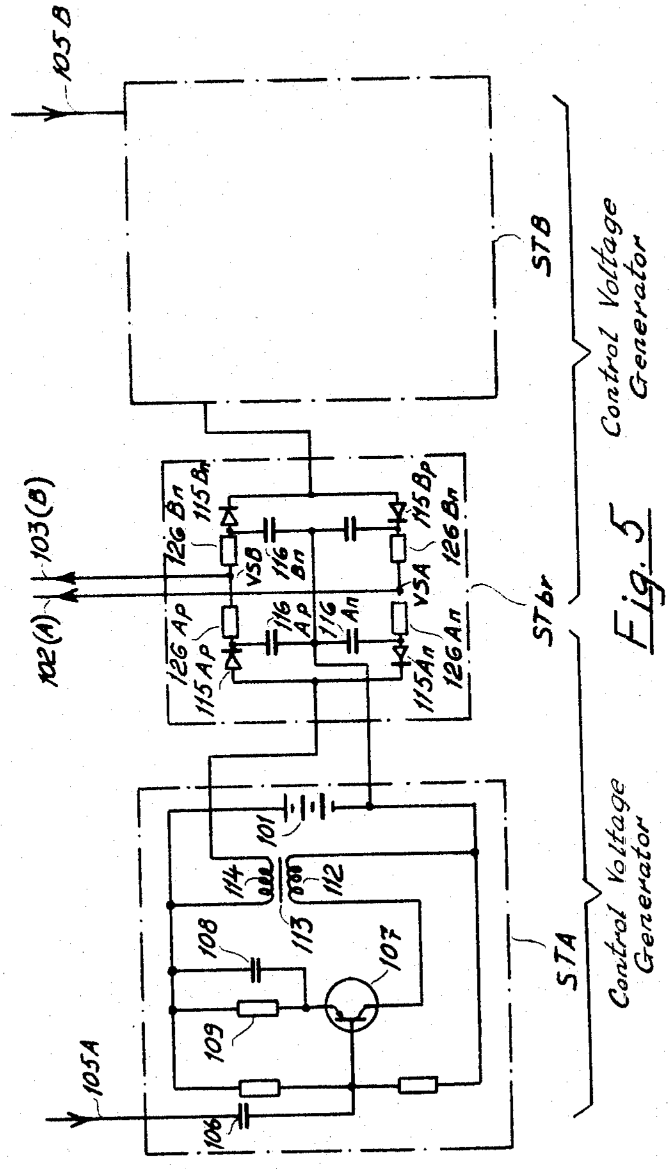

One embodiment of the invention will now be described more in detail, reference being had to the accompanying drawing, in which:

FIG. 1 illustrates a circuit diagram of a theoretical embodiment of an amplifier according to the invention, the characteristics of which are subject to mathematical analysis, FIG. 2 illustrates a curve, the meaning of which will be described in said mathematical analysis, FIG. 3 illustrates a circuit diagram of a practical embodiment of an amplifier according to the invention, and FIGS. 4 and 5 illustrate circuit diagrams for different units included in the amplifier according to FIG. 3.

At first, a mathematical analysis will be given of the different characteristics of an amplifier according to FIG. 1 and the interconnection of such characteristics.

In FIG. 1, A and B represent two identical and oppositely directed amplifier channels. To the input of the channel A a microphone M1 is connected. The microphone M1 is assumed to belong to a telephone station in a telephone system and in the same station there is a loudpeaker H1, said loudspeaker being connected to the output of the channel B. A loudspeaker H2 is connected to the output of the channel A and is assumed to be located in another telephone station. A microphone M2 is located in the last mentioned telephone station and is connected to the input of the channel B.

G1 and G2 designate sound transmission paths from the loudspeaker H1 to the microphone M1 and from the loudspeaker H2 to the microphone M2, respectively.

The rest amplification in each channel (the amplification in the channel when the microphone is not exposed to sound waves) is assumed to be concentrated to one single amplifier stage which is designated $F_o$ in each channel, the reference character $F_o$ also representing the magnitude of the said amplification.

The attenuation in each channel counted from the microphone in one station over the loudspeaker of the other station and over the sound transmission paths G1 and G2, to the microphone of said other station is assumed to be concentrated to said sound transmission paths G1 and G2, respectively.

The medium through which sound is transmitted is partly air and partly the material of the cabinet of the station. If the microphone and the loudspeaker are located in a common casing, a considerable part of the sound is transmitted through the material of said casing. The value of said attenuation in each channel is designated $Do$ and is assumed to be of the order of −56 db.

It is well known that, in order to prevent oscillations in the acoustical system consisting of the amplifier channels A and B and the sound transmission paths G1 and G2, the sum of the amplification in the said system has to be less than (or equal to) the sum of the attenuation in the system:

$$\Sigma F \leq \Sigma D \quad (1)$$

This Formula 1 is called the stability formula.

For enabling the amplification of the presently active channel which is assumed to be the channel A to be increased to its maximum value it is necessary, that in the control voltage generator STA for the channel now in question a control voltage of sufficient magnitude is generated. This control voltage is called VSA. This is assumed to happen when the signal voltage $VtA$ at the point PA has such a value that it exceeds a signal voltage $VtB$, which at the same time is taken out from a point PB in the presently inactive channel B, with an amount S, expressed in volt. The point PB is the point from which the signal voltages are supplied to a control voltage generator STB belonging to said inactive channel B. The formula for the said condition would be $$VtA \geq VtB + S \quad (2)$$

The signal voltage $VtB$ is assumed to be composed of two components viz. one $Vt2'$, which is derived solely from such signal voltages which are transmitted from the channel A to the channel B through the transmission path G2, and another, $Vt2$, which is derived from such signal voltages which are passing the channel B and generated by other sources. (The voltage component $Vt2$ can for example be caused by sound from external sound sources, to which the microphone M2 of the channel B may be exposed.)

If it is at first assumed that only the microphone M1 of the channel A is exposed to sound from an external sound source, the component $Vt2$ will be zero.

The signal voltage which is supplied to the input terminals of the channel A from the microphone M is designated $V_{in}$. The total amplification counted in multiples in channel A from the microphone M1 to the point PA is assumed to have the value $FPo$. The signal voltage $VtA$ taken out from the point PA (which signal voltage consist solely of the component $Vt1$) will then have the value $V_{in} \cdot FPo$. At the same time there appears at the point PB in the channel B as indicated above a signal voltage $VtB$ (consisting solely of the component $Vt2'$) the value of which is $V_{in} \cdot (FPo - FS)$, where the parenthesis $(FPo - FS)$ designate the amplification from the microphone M1 over the channel A, over the transmission path G2, through the microphone M2 and over that part of the channel B, which is located between the microphone B and point PB. FS designate the difference in amplification between, in the one hand, the transmission path from the microphone M1 to the point PA and, in the other hand, the transmission path from the microphone M1 to the point PB. Therefore, the following equation is obtained:

$$Vt2' = V_{in} \cdot (FPo - FS) \quad (3)$$

If, according to the made assumptions, the value $VtB$ of the Equation 2 is exchanged against $Vt2'$ and $VtA$ against $Vt1$ the following formula is obtained $$Vt1 \geq Vt2' + S \quad (4)$$

After inserting the value of $Vt2'$ according to Equation 3 in the Formula 4 the following is obtained $$Vt1 \geq V_{in} \cdot (FPo - FS) + S \quad (5)$$

But according to the foregoing $$Vt1 = V_{in} \cdot FPo$$

which after inserting in the Formula 5, will give $$V_{in} \cdot FPo \geq V_{in} \cdot (FPo - FS) + S$$

From this formula FS is solved and the following formula will be obtained $$FS \geq \frac{S}{V_{in}} \quad (6)$$

If $V_{in}$ is solved from the Formula 6 and the value thus obtained is designated $V_{in}p$, the following is obtained $$V_{in}p \geq \frac{S}{FS} \quad (7)$$

In the Formula 7 $V_{in}p$ designates the voltage which must at least be supplied to the input of the channel A for increasing the amplification in this channel to its maximum value (opening of the channel). In the following the Formula 7 will be called the opening formula.

Provided that S has a constant value the Formula 7 means that $V_{in}p$ as a function of FS forms a hyperbola. When $V_{in}$ approaches infinite values, FS approaches zero, and vice versa.

FIG. 2 illustrates graphically the dependence between $V_{in}p$ and FS according to Formula 7. From FIG. 2 it will be clear that if the channel A is going to open for a certain minimum input voltage $V_{in}po$, it is necessary that the difference in amplification between the microphone M1 and the point PA and the microphone M1 and the point PB (which difference is represented by FS) must reach a certain minimum value which value hereinafter will be designated $FSo$.

In order to restore a controlled amplifier stage in the channel A to at least the rest position by means of control voltages generated in the control voltage generator STB of the channel B, when the channel A is open, it is necessary that a signal voltage $VtB$ of sufficient amplitude is taken out from the signal voltage output point PB. This signal voltage $VtB$ is, according to the foregoing, composed from two components $Vt2$ and $Vt2'$ of which $Vt2$ is derived from the input voltage $V_{in}b$ at the input of the channel B and is generated by sound supplied to the microphone from external sound sources, and $Vt2'$ is derived from input voltages generated by sound which is transmitted to the microphone M2 from the loudspeaker H2 of the channel A.

All input voltages generated by the microphone M2 are amplified $FPo'$ times before the output point PB, where $FPo'$ designates the amplification in the channel B between the microphone M2 and the output point PB.

Under the assumption made in the foregoing, the signal voltage $Vt1$ is taken out from the output point PA of the channel A, where $$Vt1 = V_{in} \cdot FPo$$

At the output point PB of the channel B, the sum of the voltage components $Vt2$ and $Vt2'$ is obtained, where, according to Formula 4, $$Vt2' \geq Vt1 - S$$

and $$Vt2 = V_{in} \cdot FPo'$$

In order to enable the speech connection through the channel A to be broken, that is in order that the channel B as well as the channel A should be restored to rest position (which process in the following will simply be called breaking) it is obviously necessary that the control voltage obtained from the controlled voltage generator STB is equal to or exceeds the controlled voltage obtained from the control voltage generator STA, which means:

$$Vt2+Vt2' \geq Vt1$$

which means:

$$V_{in}B \cdot FPo' + Vt1 - S \geq Vt1$$

from these equations the minimum voltage required for breaking will be obtained:

$$V_{in}b = \geq \frac{S}{FPo'} \qquad (8)$$

The Formula 8 is called the break formula in the following.

Three important formulas for the amplifier have now been deduced, viz.

Stability formula $$\Sigma F \leq \Sigma D \qquad (1)$$

Opening formula $$V_{in}p \geq \frac{S}{FS} \qquad (7)$$

Break formula $$V_{in}b \geq \frac{S}{FPo} \qquad (8)$$

In the rest position, according to the definition, only F*o* and D*o* will be included in each channel. In order to obtain good continuity in the conversation, it is desirable that a channel is opened for a value $V_{in}p$ which is as small as possible, and from the Formula 7 it is evident, that in such case FS must be great. Therefore, it is evident, that F*o* must be much less than D*o* for enabling an amplifier channel to open at low input voltage.

In two way speech amplifiers hitherto known which are intended for intercommunication systems, F*o* has a value which is nearly equal the value of D*o*. In order to enable one of the channels in such an amplifier to open for low input voltage other steps must be taken.

In such amplifiers there is usually provided a sufficiently long transmission path, and consequently a correspondingly long transmission time, for the sound between, say the loudspeaker H2 and the microphone M2, for allowing the channel A to open when the microphone M1 is exposed for sound, before the control voltage generator STB has produced a controlled voltage of sufficient magnitude for opening the channel B or to counteract the opening of channel A.

In such amplifiers the effect of this time displacement has sometimes been exaggerated by introducing a time displacement of the control voltages in that way, that when, for example, the microphone M1 is exposed to sound the channel B or both the channel A and the channel B will first be provided with a blocking voltage. Thereafter, the channel A will be supplied with such control voltage that it is opened. (In some cases this opening control voltage will appear at a larger amplitude of the sound supplied to the microphone M1 as compared with the amplitude required for the blocking of channel B.)

If it is assumed in the following that the values of F*o*, D*o* and FS*o* are expressed in decibel (db) and it is also assumed that $Do=56$ db and $FSo=10$ db and in consideration of the fact that $FSO=Do-Fo$ the following equation is obtained:

$$Fo=Do-FSo=56-10=46 \text{ db} \qquad (9)$$

A sound of "normal" strength which reaches the microphone M1 in the channel A is assumed to generate an input voltage the value of which is −56 dbm. (It is assumed that 1 mw. or 142 mv. over 20Ω correspond to the value 0 dbm.)

It is assumed that an input voltage of −56 dbm. after the opening of the channel A should give an output voltage at the loudspeaker H2 of +26 dbm. (corresponding to about 400 mw. or 2.83 volts over 20Ω). Under these conditions, the necessary increase in amplification (F*q*) in decibel during the opening of the channel A may be calculated, because $$V_{in} \cdot (Fo+Fq)=26 \qquad (10)$$

in which $V_{in}$ is in dbm.

After inserting the assumed value of $V_{in}$ and the value of F*o* which has been found in the foregoing the value of F*q* is obtained:

$$Fq=36 \text{ db}$$

Because of the stability Formula 1 an increase of the attenuation in the other channel has to take place at the same time as an increase of the amplification in the first channel occurs. The value of that increase in the attenuation which is required for keeping the arrangement stable (the stability formula must be fulfilled) is calculated from the stability formula which in this case may be written $$2Fo+Fq \leq 2Do+Dq$$

where D*q* designates the necessary increase of the attenuation. After inserting the values F*o* and F*q* thus found, and the assumed value of D*o*, the following is obtained:

$$Dq=16 \text{ db}$$

It is interesting to notice, that the necessary increase of attenuation is less than the increase of amplification which has taken place. With other assumed values it will even be possible that the necessary increase of attenuation is zero while the stability formula still is fulfilled. If, for instance, FS*o* is assumed to be 26 db, F*o* will be 30 db according to Equation 9 and at an unaltered value of D*o*. If it is still assumed that an output power of +26 db is required, the value of F*q* will be 52 db according to the Formula 10. According to the stability formula, which also in this case can be written $2Fo+Fq \leq 2Do+Dq$, and after inserting the values of F*o*, F*q* and D*o* which has been found, the value of D*q* is obtained:

$$Dq \geq 0 \text{ db}$$

In a known amplifier of the kind indicated, a signal voltage which is supplied to the control voltage generator is taken out only at one point of each channel which is located after a controlled amplifier stage of such channel. In that case, no controlled amplifier stage is located after said point. The controlled amplifier stage is adapted to provide increase in the amplification F*q* as well as increase in attenuation D*q*.

The difference FS between the amplification in the transmission path from the microphone in one channel to the output point for the signal voltage, and the transmission path from same microphone to the output point for signal voltage in the other channel, is in such an amplifier, when it is in active condition, at least $Fq+Dq$. Therefore, a channel will surely be kept open, when it has been opened, as long as its microphone is exposed to sound.

According to the opening Formula 7 the following condition must, however, be fulfilled $$S \leq V_{in} \cdot FS$$

or $$S \leq V_{in} \cdot (Fq+Dq)$$

If only the limit cases $S=V_{in} \cdot (Fq+Dq)$ is considered, it is evident, that S will have a large value also at small values of $V_{in}$ if F*q* is great. It can be shown, that it is essential, in an amplifier of the kind now in question that $Fq+Dq$ ought to be kept at a low value.

According to the break Formula 8 is:

$$V_{in}b \geq \frac{S}{FPo'}$$

After inserting the expression for S which has been found, and in consideration of the fact that in this amplifier type $EPo'=(Fo-Dq)$, the following is obtained $$V_{in}b \geq \frac{V_{in}\cdot(Fq+Dq)}{Fo-Dq} \quad (11)$$

The Formula 11 indicates that the necessary breaking voltage $V_{in}b$ increases very much with increasing values of $Fq$ and $Dq$ as well as of $V_{in}$.

In another known amplifier, the signal voltage for generating control voltage is taken out at two points in each channel of which one is located before and the other after a controlled amplifier stage included in the channel. When in such an amplifier one of the channels is kept open and is passed by signal voltages, the signal voltage component which is taken out after the controlled amplifier stage will be dominating over the signal voltage component which is taken out before said amplifier stage. According to the opening Formula 7, the value of S will be obtained as in the limit case indicated in the foregoing:

$$S=V_{in}p\cdot FS$$

Since in this amplifier type, the value of FS is very much dependent of the increase in amplification $Fq$ which has occurred in the active channel, the value of S approximately will be as follows:

$$S\simeq V_{in}p\cdot Fq$$

In order that the value of S shall be low also for great values of $V_{in}$, $Fq$ must have a low value also in this case.

In an advanced construction of the last-mentioned amplifier also the signal voltage circuits are provided with controlled amplifiers. The function of that construction is, however, difficult to analyse and hardly possible to make clear by means of simple mathematical formulas.

In the amplifier according to FIG. 1, there is in each channel a microphone M1, M2, a loudspeaker H2, H1, a sound transmission path G1, G2, an amplifier unit $Fo$A, $Fo$B, to which the rest amplification is assumed to be concentrated, an output point for signal voltages PA, PB and a control voltage generator STA, STB. Further, there is also controllable amplifier stages FP and FS for each channel for providing increase of the amplification, controllable amplifier stages DP and DS for increase of the attenuation, and an amplifier FT for amplification of the signal voltages which are taken out from the output point PA, PB in each channel, said amplification taking place before the said signal voltages are supplied to the control voltage generators STA or STB.

The outputs of the control voltage generators STA and STB in the channels A and B, respectively, are connected to two opposite points of a bridge circuit comprising four branches. Control voltages VSA and VSB, respectively, are taken out through conductors 102A and 103B, respectively, from the other two opposite points of said bridge circuit. The control voltage VSA is supplied to the amplifier stages FP and FS in the amplifier channel A for increasing the amplification in that amplifier channel and also to the attenuation stages DP and DS in the amplifier channel B for increasing the attenuation in the last-mentioned amplifier channel. Correspondingly, the control voltage VSB is supplied to the amplifier stages FP and FS of the amplifier channel B and to the attenuation stages DP and DS of the amplifier channel A. Each branch in the said bridge circuit comprises a diode 115 which is connected in series with a resistor 126. The diodes 115 and the resistors 126 have been designated with indicia A*n*, A*p*, B*n* and B*p*, respectively, in dependence of whether they belong to the channel A or the channel B and whether the control voltages produced by the said elements are positive or negative.

The junction between each resistor 126 and each diode 115 is connected to ground through a capacitor 116.

For the sake of simplicity it will be assumed in the following that the amplifier FT is included in the amplifier unit $Fo$ (the rest condition amplifier). It will further be assumed that in the rest condition the amplification of each of the controlled amplifier stages FP and DP, FS and DS, respectively, is zero. When a channel is opened by means of the control voltage supplied to the amplifier stages FP and FS the amplification in the amplifier stages DP and DS in the said channel still will be zero. When an amplifier channel is blocked because of control voltages supplied to the controlled amplifier stages DP and DS, the amplification of the amplifier stages FP and FS will be zero.

It will be assumed in the following that the reference character for each amplifier stage included in the amplifier also designate the value of the amplification and the attenuation, respectively, in said stage. FIG. 1 of the drawing is drawn in that way, that the designations of the quantities for explaining the function of the different units, which have been used in the foregoing mathematical deduction, is in agreement with the reference characters used in the figure for the different amplifier units and the values of the amplification and attenuation of said units.

It will now be assumed that the channel A is the active channel and that it leaves an output voltage $$V_{out}=V_{in}\cdot(Fo+Fq)$$

in which according to already made assumptions $$Fq=FS+FP=36 \text{ db}$$

At the same time the channel B is blocked because of an increase of the attenuation in said channel, $$Dq=DP+DS.$$

According to the stability Formula 1 the following is obtained:

$$2Fo+FP+ES\leqq 2Do+DP+DS$$

If the values of $Fo$, $FP+FS$ and $Do$ which has been assumed in the foregoing are inserted in that equation the following is obtained $$Dq=DP+DS=16 \text{ db}$$

If the amplifier is in rest condition and the microphone of the channel A is exposed to sound which causes an input voltage $V_{in}$, a signal voltage $Vt1$ will be obtained at the point PA. $Vt1$ is amplified by a value FA where $$FA=Fo+FP \quad (12)$$

In the output point PB of the channel B a signal voltage $Vt2'$ is obtained which is equal to $V_{in}$ amplified by a value FB, where $$FB=Fo+FP+FS-Do+Fo-DP \quad (13)$$

According to Equation 9

$$Fo=Do-FSo$$

which after inserting in Equation 13 will give $$FB=Fo+FP+FS-FSo-DP \quad (14)$$

The difference amplification, that is the difference between the amplification in the path which goes from the microphone M1 to the output point PA and the path which goes from the same microphone to the output point PB is:

$$FA-FB=Fo-FP-(Fo+FP+FS-FSo-DP)$$

and, consequently $$FA-FB=FSo-FS+DP \quad (15)$$

According to the assumption $FS=0$ and $DP=0$ in the rest condition. Therefore:

$$(FA-FB)V_{in}=0-FSo \quad (16)$$

This means, that the channel A will open for an input voltage $V_{in}p$ of the magnitude $V_{in}po$ (FIG. 2).

Further, if the amplifier is arranged in that way, that for great values of $V_{in}$A, $FS-DP=FSo$, the value of $FA-FB=FSo-(FS-DP)=0$, which is quite in agreement with the curve according to FIG. 2; because it means that S can have values near zero.

If the microphone M2 of the presently passive channel B now is exposed to sound, the following condition has to be fulfilled if an interruption of the connection through the channel A is to occur according to the break Formula 8

$$V_{in}b=\frac{S}{FPo'}$$

$$FPo'=Fo-DP$$

Therefore, the expression for $V_{in}$ will be $$V_{in}b=\frac{S}{F_o-DP}$$

If in this equation S approaches zero for great values of $V_{in}A$, also $V_{in}B$ will approach zero (when the denominator has a value unequal to zero).

The characterizing feature of the amplifier according to the invention is, therefore, that it is possible to let it have a rest amplification which is considerably lower than the rest attenuation. Therefore, a reliable and smooth opening function is obtained. Because of the fact, that means for increasing and decreasing the amplification are arranged before as well as after the output point for signal voltages in each channel, the break process can take place for very low voltages in the channel which is presently inactive. Because of said circumstances the switching over of the conversation direction is obtained very easily and smoothly.

In addition to the foregoing, there is still another case which may be considered, viz.

$$FS>FSo+DP$$

In this case, the control voltage $VtB$ supplied to the control voltage generator STB of the presently inactive channel (for example B) will exceed the signal voltage $VtA$ which is supplied to the control voltage generator STA, of the active channel A. Thereby the output power from the channel A will decrease because the amplifier stages FB and FS of that channel will be supplied with a lower control voltage VSA. Said decrease of the output power will be noticed as an acoustical compression.

A compression of that kind often occurs suddenly and causes alternating interruptions and openings.

By arranging the amplifier in such a manner, that the decrease of the amplification in one of the channels occurs substantially in that part of the channel, which is located after the output point for signal voltages in said channel, the said decrease has no influence on the signal voltage component $Vt1$ which contributed very much to the production of control voltages in the active channel, and, therefore, the sudden compression process will be avoided.

Because the different amplifier stages for obtaining increase and decrease of amplification are separated and independent of each other, the function of each such stage can be adjusted individually. Therefore, it is possible and suitable to arrange the different controllable amplifier stages in that way, that the control voltage which is required for increasing the amplification in a stage, adapted for such increase (FP and FS), has the same polarity as the control voltage which is required for decreasing the amplification in an amplifier stage DP and DS, adapted for such decrease. By this means, only one output point for control voltage of one polarity from each control voltage generator is required. If a voltage reduction, for example due to a short circuit to minus, should occur at any of the output points for control voltages, this has to result that the amplification in one of the channels will increase. But at the same time the amplification in the other channel will decrease, and therefore the stability condition will still be fulfilled. This property of the amplifier according to the invention is one of its advantages over amplifiers hitherto known. In known amplifiers where two control voltages are taken out from each control voltage generator, of which control voltages one has one polarity and is used for keeping the active channel open and the other, which has a polarity of an opposite sign is used for blocking the inactive channel, no similar effect is obtained. If an unintentional reduction for example due to a short circuit to ground of the control voltage which keeps the inactive channel blocked should occur in a known amplifier, this would mean that the attenuation in the blocked channel would decrease. The stability condition would no longer be fulfilled and self-oscillation due to accoustical reaction would occur.

Another advantage resulting from the said property of the amplifier according to the invention lies in the fact that if by some reason the displacement of the voltage level of the control voltages which are taken out at the both output points should occur when the amplifier is in rest condition, such a displacement, independent of the direction of the same, would not have any influence on the opening function of the amplifier when a microphone connected to one of the amplifier channels is exposed to sound. The said displacement of the control voltages in rest condition would only have to result that the two amplifier stages FP and DP in one channel which are located before the output point PA or PB for signal voltages, are controlled with about the same amount, but one of them in an attenuating and the other in an amplifying direction. The sum of the rest amplification, counted from the microphone to the said output point, will, therefore, be substantially unchanged.

In FIG. 3, there is shown in the form of a block diagram a practical construction of an amplifier according to the invention. This amplifier comprises two channels A and B which are identical. Each channel comprises a microphone M1 and M2, respectively, an amplifier φF, a first controllable amplifier stage FP, a controllable attenuating stage DR, a second controllable amplifier stage FS, and end amplifier stage φS, and a loudspeaker H1 and H2, respectively. In each channel there is also included a control voltage generating device STA and STB, respectively and two series resistors RS1 and RS2, respectively, between which the output point PA and PB, respectively, for signal voltages which are supplied to the control voltage generator STA and STB, respectively, are located.

The microphone M and the loudspeaker H in each channel can be of any suitable type. Also the amplifier φF and the end amplifier φS may be of any suitable type.

The controlled amplifier stages FP and FS in each channel correspond to the similarly designated amplifier stages in the arrangement according to FIG. 1.

The unit designated DR is adapted in combination with the series resistors RS1 and RS2 automatically to perform the same functions as the attenuation stages DP and DS in the arrangement according to FIG. 1.

The part of each channel which is constituted by the units FP, FS, DR and STA and the series resistors RS1 and RS2 (for the channel A) is shown more in detail in FIG. 4.

The signal voltage derived from the preamplifier F is supplied through a conductor 100 and a capacitor C3 to the base electrode of a transistor TP. The emitter electrode of this transistor TP is connected through a resistor RE1 to the positive pole of a voltage source 101 which is common for the amplifier. The collector electrode of the transistor TP is connected through a resistor RS1 to the negative pole of said voltage source 101. The base electrode of the transistor TP is connected to the central point of a voltage divider formed by two resistors R2 and R3, which is connected between the poles of the voltage source 101.

The emitter resistor RE1 of the transistor TP, which has a relatively high value, is not shunted by any capacitor and, therefore, the transistor functions as an amplifier stage with a strong negative feedback. This means, that the amplifier stage constituted by the transistor has a very low amplification factor.

(It is here presumed that the circuit which consists of the three capacitors C2, C*p* and C7 and the two resistors RST1 and R4, due to the rather high resistance value of the last-mentioned resistor, has a high resistance as compared with the resistor RE1 and, therefore, that the increase in the emitter impedance of the transistor TP caused by said circuit is negligible.)

The emitter resistor RE1 is, however, connected in parallel with a series circuit in which is included a capacitor C2, a transistor TPE1 and the parallel connection of a resistor R1 and a capacitor C1. In the rest condition, the transistor TPE1 is blocked and, therefore, the said series circuit on this occasion has no influence on the function. If the channel is passed by signal voltages the base electrode of the transistor TPE1 will be supplied with a control voltage through a conductor 102 and a resistor RST1 so that the transistor will be conducting. The transistor represents a resistance the value of which is approximately equal to $24/Ie\Omega$, where I*e* is the current in *m*A, which passes the transistor.

It is now assumed, that the capacitor C1 and C2 have such values, that their impedance may be neglected in comparison with the inherent resistance of the transistor TPE1. The emitter impedance of the transistor TP for A.C. voltages will, therefore, when the channel is passed by signal voltages, mainly be equal to the parallel connection of the resistor RE1 and the inherent resistance of the transistor TPE1, Then the channel is quite open, the last-mentioned resistance is low in comparison with the resistor RE1, and in this case the said resistor can be neglected.

From the collector electrode of the transistor TP the signal voltage is led through a resistor RS2 and a capacitor C9 to the base electrode of a transistor TS.

The transistor TS has an emitter resistor RE2 which is not shunted by any capacitor but which is connected in parallel with a circuit in which a transistor TPE2 is included, said transistor TPE2 being controlled by control voltages.

The transistor TS and its associated circuit components are arranged quite similarly as the transistor TP and its circuit component, and the mode of operation of the amplifier stages which are constituted by these two transistors correspond exactly to each other.

The amplifier stage constituted by the transistor TP corresponds to the amplifier FP according to FIG. 3 and similarly the amplifier stage constituted by the transistor TS corresponds to the amplifier FS according to FIG. 3.

The series resistor RS2 according to FIG. 4 corresponds to the series resistor RS2 according to FIG. 3. The series resistor RS1 in FIG. 3 corresponds to the inherent resistance of the transistor TP in the device according to FIG. 4. Said inherent resistance is rather high because, as has been stated above, the transistor has a strong negative current feed-back.

A parallel resistance comprising the parallel connection of a fixed resistance RP and a transistor TD and associated circuit components is connected to the transmission conductor between the series resistance RS2 and the capacitor C9 in the arrangement according to FIG. 4. The said parallel resistance forms an attenuating stage and corresponds to the arrangement DR in FIG. 3.

In the rest condition, the transistor TD is supplied with such a base voltage, that the transistor is totally blocked. When the opposite channel is passed by signal voltages, the base electrode of said transistor will be supplied with a control voltage through a conductor 103 and a resistor RST2 (the end of which not connected to the base electrode being connected to the minus pole of the voltage source 101 through a condenser C8), said control voltage making the transistor conducting. In that case, the transistor represents a resistance of the magnitude $25/Ie\Omega$, where I*e* designates the current in milliamperes through the transistor. The resistor of the transistor, when it is totally open, is assumed to be low in comparison with the resistance of the resistor RP but great in comparison with the imepdance of a parallel connection of a resistor R5 and a capacitor C4 which is connected in the emitter circuit of the transistor TD. The value of the total shunt resistance will, therefore, be varying approximately between the values RP and $25/Ie$.

When the resulting parallel resistance decreases, the attenuation of the unit illustrated in FIG. 4 increases, because the voltage drop over the resistors RS2 and RS1, which is constituted by the inherent resistance in the transistor TP, increases. The signal voltage which is supplied to the base electrode of the transistor TS decreases in this case. But also the signal voltage which appears at the output point PA decreases and, therefore, the increase in the attenuation caused by the transistor TD will have influence on the signal voltage at the output point PA as well as on the signal voltage after the resistor RS2.

The transistor TD and associated circuit elements and the series resistors RS2 and RC1 contribute to the functions which are attributed to the attenuating amplifier stages DP and DS in the arrangement according to FIG. 1.

FIG. 5 illustrates a circuit diagram over the control voltage generators STA and STB according to FIG. 3 and the interconnection of said units, the unit STA being shown in detail. (The unit STB is constructed in a similar way.)

For the unit STA the signal voltage from the output point PA (in channel A, see also FIG. 4) is supplied through a conductor 105A and through a capacitor 106 to the base electrode of a transistor 107. The emitter electrode of the transistor 107 is shunted by a resistor 109 and a capacitor 108, the resistor 109 being connected to the positive pole of the voltage source 101 which is identical with the voltage source 101 in FIG. 4. The base electrode of the transistor 107 is supplied with suitable bias from a voltage divider comprising two resistors 110 and 111, said voltage divider being connected between the two poles of the voltage source 101. The collector electrode of the transistor 107 is connected to one end of the primary winding 112 of a transformer 113. The other end of said primary winding 112 is connected to the minus pole of the voltage source 101.

The transformer 113 has a secondary winding 114 one end of which is connected to the plus pole of the voltage source 101 and the other end of which is connected to the cathode of the rectifier 115 A*n*, and also to the anode of the rectifier 115 A*p*, included in a bridge circuit ST*br*. The opposite poles of the rectifiers 115 A*n* and 115 A*p* are connected to the minus pole of the voltage source 101 through the capacitor 116 A*n* and 116 A*p*, respectively, and also connected to conductors 102A and 103B, respectively, through resistors 126 A*n* and 126 A*p*, respectively. The conductor 102A is assumed to be connected to the conductor 102 in the arrangement according to FIG. 4 and the conductor 103B is assumed to be connected to a conductor corresponding to the conductor 103 (FIG. 4) but belonging to the B-channel of the amplifier.

Correspondingly, the signal voltages are supplied through the conductor 105B to the controlled voltage generator STB (shown in FIG. 5 as a block). The transformer of the unit STB, corresponding to the transformer 113 of the unit STA, has its secondary winding connected to the rectifier 115 B*n* and also to the anode of a rectifier 115 B*p*. The opposite poles of said rectifiers are connected to the minus pole of the voltage source 101 through capacitors 116 B*p* and 116 B*n*, respectively, and also to conductors 102A and 103B, respectively, through resistors 126 B*p* and 126 B*n*, respectively.

The connection points to which the conductors 102A and 103B are connected in the bridge circuit ST*br* are designated VSA and VSB, respectively, in FIG. 3.

The signal voltages which are supplied to the base electrode of the transistor 107 through the conductors 105 are amplified and supplied to the primary winding 112. The signal voltages are taken out from the secondary winding 114 and rectified in the rectifier 115 A*n*, the anode of which will obtain a negative potential in respect to the plus pole of the voltage source 101. The remaining A.C. voltage will be removed through the associated capacitor 116 A*n*. The negative potential in the point VSA is the control voltage generated by the device and is supplied to the controllable amplifier stages FP and FS of the channel A to which the device belongs and the attenuating transistor TD in the opposite channel B through the conductor 102A.

If the microphone of the channel B is exposed to sound from the loudspeaker of the channel A while the channel A is active, the rectifier 115 B*p* will produce a control voltage which is supplied to the point VSA through the resistor B*p* and the conductor 102A. This control voltage has opposite polarity (positive polarfity) as compared with the voltage produced by the rectifier 115 A*n* and it will therefore produce a decrease in the control voltage VSA which keeps the channel A open. In that case, the compression effect described in the foregoing will occur, which means that the sound which reaches the microphone of the channel B is decreased. The counteracting (positive) voltage in the point VSA decreases correspondingly and the voltages will balance each other to a certain equilibrium condition without any risk for the connection through the channel A to be broken. It is only when the microphone of the channel B is exposed to sound of sufficient strength in addition to the sound which comes from the loudspeaker of the channel A than an interruption of the connection through the channel A (and the following change of the speech direction) will take place. For the process just described the break Formula 8 has validity.

If the channel B is passed by signal voltages, the operation of the device will be quite similar to the operation just described for the channel A. The only difference will be that the units STA and STB and associated rectifiers in the bridge circuit ST*br* change functions.

In addition to the advantages which have already been mentioned, the device according to the present invention has also that advantage that its characteristics within wide limits are independent of the unevenness in the transistors and many of the other circuit components included in the device. It has already been described that the amplifier stages FP and FS are equipped with a negative feedback. When these amplifier stages are controlled, the impedance which causes a negative current feedback varies between the values RE1 and $25/Ie_{max}$ for the amplifier stage FP where RE1 can be chosen with a sufficiently extcat value. The value of $Ie_{max}$ is not critical. For the amplifier stage FS the corresponding limits are RE2 and $25/Ie_{max}$. For the attenuating stage the limits of variation are RP and $25/Ie_{max}$. Of the mentioned limit values it is only the values of RE1, RE2 and RP which are critical, because they represent the characteristics of the amplifier in rest condition, and it is the rest characteristics of the amplifier which to a large extent define the opening sensitivity, stability and other important characteristics.

A number of modifications may be possible to make within the scope of the present invention. Thus, it is possible to exclude the diodes 115 A*p* and 115 B*p* and the resistors 126 A*p* and 126 B*p* in the bridge circuit ST*br*. In that case, the conductor 102A would be connected only to the resistor 126 A*n* and the conductor 103B only to the resistor 126 B*n*. The soft automatic adjustment of the amplification in the active channel which has been described in the foregoing will, however, not be obtained with an amplifier designed in that way and, therefore, the risk for instability and sudden alterations of the amplification will be more pronounced.

I claim:

1. In a two-way speech amplifier, two similar amplifier channels, an automatically operating control device for each channel, said control device being adapted, under the influence of a signal voltage which is applied to the input of the channel, to which the control device belongs, to increase the amplification in such channel from a moderate value or rest amplification to an operating value, and to decrease the amplification in the other channel from a value corresponding to the rest amplification to a smaller value, an output point in each channel for taking out a part of the signal voltage passing said channel to supply said part to the control device of said channel, means in said control device for converting said part of signal voltage to a rectified control voltage, means for supplying said control voltage to two controllable amplifier stages in said channel to which the control device belongs as well as to controllable attenuator stages in the other amplifier, both of said amplifier stages being adapted, upon the supply of said control voltage, to bring about an increase of the amplification of the signal voltage passing said stages, one of said controllable amplifier stages being located before and the other stage after said output point.

2. In a two-way amplifier as claimed in claim 1, two attenuator stages in each channel, means for supplying control voltage from the automatically operating control device belonging to one channel to said attenuator stages of the other channel for bringing about the decrease of the amplification in said channel, one of said amplifier stages being located before and one after said output point.

3. In a two-way amplifier as claimed in claim 1, the controllable amplifier stage of each channel located after said output point of said channel having a maximum amplification value which is equal to or greater than the value of attenuation in rest condition of all the controllable attenuator stages in one channel together with the attenuation in rest condition of all the controllable attenuator stages of one channel located before said output point of such channel.

4. In a two-way amplifier as claimed in claim 1, said automatic control device of each channel, when supplied by signal voltage from said output point of the channel, being adapted to generate a control voltage of one single polarity (positive or negative) and the controlled amplifier stages of each channel being adapted to increase the amplification and the controlled attenuator stages of each channel are adapted to increase the attenuation, when such amplifier stages and attenuator stages are supplied with control voltage of said polarity.

5. In a two-way amplifier as claimed in claim 1 the controlled amplifier stages and the controlled attenuator stages of each channel being adapted, when a controlled voltage of a given magnitude is supplied to such stages, to bring about increase of the attenuation, which is at least of the same magnitude as the increase of the amplification which occurs.

6. In a two-way amplifier as claimed in claim 1, the controlled amplifier stage located before said output point in each channel being adapted to reach its maximum amplification value at a lower value of the control voltage applied thereto than the controlled amplifier stage, which is located after said output point.

References Cited

UNITED STATES PATENTS

| | | | |
|---|---|---|---|
| 2,468,553 | 4/1949 | Herrick | 179—170.8 |
| 2,964,598 | 12/1960 | Parker | 179—170.6 |
| 3,146,313 | 8/1964 | Ulin | 179—1 |

KATHLEEN H. CLAFFY, *Primary Examiner.*

WILLIAM C. COOPER, *Examiner.*

R. LINN, H. ZELLER, *Assistant Examiners.*